United States Patent [19]
Miner

[11] 3,866,479
[45] Feb. 18, 1975

[54] TUNER DRIVE ASSEMBLY FOR SELECTING A LIMITED NUMBER OF CHANNELS IN THE UHF BAND

[75] Inventor: Carroll R. Miner, Wilbraham, Mass.
[73] Assignee: General Instrument Corporation, Newark, N.J.
[22] Filed: Nov. 19, 1973
[21] Appl. No.: 417,142

[52] U.S. Cl................ 74/10.85, 74/10.6, 74/10.45, 74/89.15
[58] Field of Search.............. 74/10.85, 10.6, 10.45, 74/89.15, 441, 440, 424.8 R, 10.9

[56] References Cited
UNITED STATES PATENTS

| | | | |
|---|---|---|---|
| 3,555,914 | 1/1971 | Mase | 74/10.6 |
| 3,561,275 | 2/1971 | Mayer et al. | 74/10.85 X |
| 3,634,002 | 1/1972 | Vollrath | 74/89.15 X |
| 3,736,801 | 6/1973 | Bloom et al. | 74/89.15 X |
| 3,742,771 | 7/1973 | Kitamara | 74/10.6 |
| 3,808,896 | 5/1974 | Ogasaware et al. | 74/10.85 X |

*Primary Examiner*—Samuel Scott
*Assistant Examiner*—Randall Heald

[57] ABSTRACT

A tuner drive assembly for use with a tuning mechanism for selecting one of a limited number of channels in the UHF band. The assembly has a rotatable turret which is driven by the input shaft. The turret has first and second spaced end sections with a plurality of screw elements rotatably mounted therebetween. One screw element is provided for each channel to be selected. Each element has a threaded portion and an internally threaded member normally engaging the threaded portion is mounted thereon for axial movement along the element as the element is rotated. The threaded portion is spaced from both end sections such that the member is permitted to disengage or "run off" the threaded portion at either end of its travel as the element is rotated, thus preventing breakage or jamming of the member and the element. Means are provided which are effective when disengagement occurs to relatively move the member and the threaded portion together to cause re-engagement thereof when the element is rotated in the opposite direction. Means are provided for sensing the axial position of the member in order to corporeally condition the tuning mechanism to select the appropriate channel in accordance therewith. First and second indicating means are provided for indicating the rotational position of the turret and the axial position of the member, respectively.

9 Claims, 8 Drawing Figures

TUNER DRIVE ASSEMBLY FOR SELECTING A LIMITED NUMBER OF CHANNELS IN THE UHF BAND

The present invention relates to tuner drive assemblies and more particularly to a UHF tuner drive assembly capable of conditioning a tuner to select a limited number of UHF channels from the seventy or more possible channels in the UHF band.

Tuners designed when actuated to tune a receiving set such as a television receiver to a selected one of a plurality of channels are well known and take many forms. Insofar as the present invention is concerned, the precise nature of the means employed in the communications receiver itself to effect tuning to a particular reception frequency forms no part of the present invention. What this invention is directed to is the mechanism by which a tuning element, whatever its character, is appropriately conditioned for precise reception of a particular channel, and more specifically, this invention is directed to a mechanism which can be preset to select a limited number of channels from the seventy possible channels in the UHF band.

To provide a device capable of tuning to any selected one of the seventy possible channels in the UHF band with sufficient accuracy so as to be able to distinguish in its tuning between any two adjacent channels presents problems, both mechanical and electrical. The public has become accustomed to step-by-step T.V. tuning in conjunction with the twelve available channels in the VHF band, and therefore expects a similar tuning capability in the UHF band, but the much greater number of channels which must be tuned in the UHF, and the very high precision of tuning which is required because of the relatively close spacing of those channels, has given rise to special new mechanical arrangements for the UHF T.V. tuners.

It is important to the tuner manufacturer to produce tuners of extremely small size and at an exceedingly low cost. Set manufacturers are under pressure from the customers to produce T.V. receiving sets which take up as little space as possible. The T.V. tube itself requires an appreciable amount of space, the electrical circuitry involved in tuning also presents certain space problems, and consequently it is desired by the set manufacturers that the mechanical arrangement provided for effecting tuning from one channel to another be of minimal size. Moreover, since the sales of T.V. sets to the public are very competitive as to price, and since a given manufacturer produces very large numbers of receiving sets, a savings of but a few cents in cost per set, or per tuner, can represent a very appreciable amount of money when a full year's sales are taken into consideration.

The requirements for small size and low cost represent only one side of the coin. The tuner must also be sturdy and reliable, since it will be operated by the owner of the T.V. set many of hundreds of thousands of times over the life of the set for changing from one channel to another, and any failure of the mechanical tuner portion of the receiving set will be treated by the consumer, who does not known the cause of a given malfunction but is only interested in the fact that the malfunction has occurred at all, is simply a flaw in the set as a whole, thus reflecting directly upon the reputation of the set manufacturer and effecting the ability of the manufacturer to sell a set of his manufacture to that person in the future. For comparable reasons, it is essential that the mechanical tuning arrangement be available to be operated by the user with extreme ease and with simplicity of manipulation. Hence, the structure involved must be sturdy and so constructed as to move readily without binding.

Mechanical arrangements can be, and have been, devised capable of effecting step-by-step tuning from one T.V. channel to another, not only within the twelve channel VHF spectrum, but also within the 70 channel UHF spectrum, and these prior art constructions meet the above set forth requirements to greater or lesser degrees. However, any design of the prior art had to represent the significant compromise. Sturdiness can be achieved at the expense of size and weight. Low cost can be achieved at the expense of sturdiness. To achieve reliability of action with the small device is much more difficult than with a large device. Attempts to reduce size and weight may result in parts which are improperly supported or mounted and which therefore will tend to fail in use. Increased facility of operation may call for the use of greater numbers of parts or larger parts than would otherwise be the case, thus adding to size and cost.

Problems associated with tuner drive mechanisms used in UHF receivers capable of selecting any one of the seventy or more channels in the UHF spectrum are particularly acute. Although tuner drive mechanisms have been developed to accomplish this function they represent only a compromise of the desirable features mentioned previously. Further, in a very real sinse such complex mechanical devices are not essential to the comsumer because in any one viewing area only a limited number of UHF channels are available to the viewer. However, since T.V. receivers are produced for nationwide consumption, and because the UHF channels available in any one part of the country occur at different frequencies from the UHF channels available in other parts of the country, T.V. receivers having UHF reception capability are normally manufactured to receive the entire UHF spectrum even though only a limited number of channels will be available to the viewer in any particular area. This, then, represents a great waste because the complexity which is necessitated by a drive assembly capable of step-by-step tuning of all of the 70 channels in the UHF channel band contributes substantially to the size, weight and cost of the assembly. since the viewer can receive only a limited number of channels anyway, this represents a tuning capability which cannot be utilized and therefore the consumer is paying for versatility from which he does not benefit.

On the other hand, if the tuner drive assembly is manufactured to be capable of receiving only a limited number of the channels in the UHF spectrum, it will be necessary to adjust this assembly during installation such that it is capable of receiving those UHF channels which are available in the area in which it is used. This presents a problem because tuner drive assemblies generally are not easily adjustable in this manner. Thus, it is necessary in a UHF tuner drive mechanism capable of receiving only a limited number of the channels in the UHF band to provide means for easily adjusting the assembly such that the desired channels can be selected for the area in which it is used.

It is, therefore, a prime object of the present invention to devise a UHF tuner drive assembly capable of receiving a limited number of channels from the UHF band which will achieve the desired objectives of reliability, sturdiness, low cost, small size, and low weight to an optimum degree with respect to all of said requirements, and with a minimum amount of sacrifice with respect to any given requirement in order to achieve required results with respect to some other requirement.

It is another object of the present invention to provide a UHF tuner drive assembly capable of receiving a limited number of channels from the UHF band wherein the assembly can be easily adjusted during installation to select the desired channels.

It is a further object of the present invention to provide a UHF tuner mechanism for receiving a limited number of channels from the UHF band which incorporates means for indicating to the installer the channels to which the selector is adjusted to receive.

In accordance with the present invention, a tuner drive assembly for use with a UHF tuning mechanism is provided capable of being adjusted to corporeally condition the tuning mechanism to select a limited number of UHF channels from the UHF band. The tuning mechanism to be used with the drive assembly of the present invention is the type which has a rotary control shaft which is rotated to condition the tuning mechanism to select a particular frequency. The assembly comprises a housing and a rotatable input shaft mounted on the housing. A rotatable turret is situated in the housing and operably connected to the input shaft to be driven thereby. The turret comprises first and second spaced end sections with a plurality of screw elements rotatably mounted therebetween. One screw element is provided for each of the limited number of channels to be selected. Each screw element has a threaded portion, and an internally threaded member normally engaging the threaded portion is mounted thereon such that it is axially movable by the rotation of the element. Means are provided for rotating each of the elements. The screw portion is spaced from the end sections, respectively, by a distance slightly less than the distance between the last thread on the member to engage the portion and the opposite end of the member therefrom. Means for permitting the member to disengage the threaded portion when the element is rotated in a direction to move the member adjacent one of the end sections is provided. This means is effective when disengagement occurs to relatively move the member and the threaded portion together to cause re-engagement thereof when the element is rotated in the opposite direction. Sensing means for sensing the axial position of the member and for rotating the control shaft in accordance therewith is provided. First indicating means operably connected to the turret to indicate the rotational position thereof and second indicating means operably connected to the control shaft rotating means to indicate the position of the member are also provided.

As will be described in detail below, the rotational position of the tuner control shaft in the present invention depends upon the axial position of the internally threaded member. The axial position of the internally threaded member depends in turn upon the rotational position of the screw element. Since the screw element is rotatably mounted between the end sections of the turret, it is necessary to provide means for permitting the member to run off the threaded portion of the screw element at either extremes of the path of axial movement of the member. If this were not the case, the member would lodge between the threaded portion of the screw element and the adjacent end section when the member approached one of the ends of the screw element. Further rotation of the element in the same direction would cause breakage or jamming of the member, thus preventing the proper operation of the device.

To eliminate this problem, a compressible member, preferably in the form of an O-ring is situated at one end of the screw element. The threads of the screw element are spaced from the compressible body such that when the screw element is rotated such that the member is adjacent the compressible body further rotation of the screw element in that direction will cause the member to compress the body thus permitting the member to disengage the threaded portion. The compression of the body creates a force on the member, tending to push it back towards the threaded portion of the screw element. Therefore, when the screw element is rotated in the opposite direction the member will re-engage the threaded portion thus permitting axial movement of the member in the other direction.

At the other end of the screw element, run-off is accomplished by means of a different mechanism. The screw element itself is made axially movable relative to the end sections from a normal position to an offset position. The screw element is in the normal position at all times except when the member is adjacent the end section not having the compressible body affixed thereto. When this happens, rotation of the screw element, which must cause relative motion between the screw element and the member, will cause axial movement of the screw element because of the limitation of the movement of the member. The axial movement of the screw element will permit the member to run off the threaded portion which at this end is also spaced from the end section. A resilient body is provided which exerts a force on the screw element when the screw element is in the offset position, tending to move the screw element back towards the normal position. Therefore, when the screw element is rotated in the opposite direction, the resilient member will force the member to re-engage the threaded portion such that the member can axially move in the opposite direction.

The axial position of the member with respect to the screw element will determine the rotational position of the tuner control shaft and thus the channel which is selected by the tuner. Channel indicia means are provided to indicate which of the limited number of channels the receiver is tuned to. Means are provided for adjusting the rotational position of each of the screw elements. Each element represents a potential channel selection. The number of channels which can be selected equals the number of screw elements on the turret and each channel in turn is selected sequentially as the turret is rotated. Normally, the axial position of each of the members will be preset during installation. In order to accomplish this with greater ease, a second indicia means, separate and apart from the channel indicia means, is provided to permit the installer to condition the drive assembly such that the tuner selects the desired UHF channels. After the channels are set, the installer will affix the appropriate numerical indicia on the channel indicia means such that the viewer can rotate the input shaft to a particular position and the channel indicia means will indicate which channel has been selected.

To the accomplishment of the above and to such other objects as may hereinafter appear, the present invention relates to a tuner drive assembly for use with a UHF tuning mechanism for selecting one of a limited number of channels in the UHF band, as defined in the appended claims and as described in the specification, taken together with the accompanying drawings in which numerals refer to like parts and in which:

The tuner drive assembly of the present invention is specifically designed for use in UHF tuners, although it may be utilized in other applications. However, the tuner mechanism itself plays no part of the present invention and therefore is not illustrated. It will be understood, however, that the tuner may be constituted by a rotary variable condenser tuned transmission line or the like, provided with a control shaft, generally designated A, which is, in fact, the output shaft of the assembly herein disclosed, the rotation of shaft A corporeally conditioning the tuner mechanism to select the desired frequency. A rotatable and axially movable coarse tuning shaft, generally designated B, is situated to extend beyond the assembly housing to be easily accessible. The rotation of control shaft B rotates a turret, generally designated C. Turret C is provided with a number of position adjustable members, generally designated D, one such member D being provided for each of the limited number of channels to be selected. Means, generally designated E, operably connected with control shaft A, are capable of sensing the axial position of each of the position adjustable members D and rotating control shaft A in accordance therewith. Channel indicia means, generally designated F, are operably connected to turret C to indicate the rotational position thereof. Means, generally designated G, are provided to adjust the axial position of each of the members D in accordance with the rotational position of input shaft B when input shaft B is axially moved from its normal channel selecting position to a second fine tuning position. A second indicia means, generally designated H, is provided to indicate the position of each of the members D. Second indicia means H is not normally visible and is utilized during the installation of the receiver to preset each of the position adjustable members D such that the tuner drive assembly will select the UHF channels which are available in the area in which the receiver is used.

More specifically, the tuner drive assembly of the present invention is encased in a housing 10 having a rear wall 12 to which shaft B is rotatably mounted. Shaft B extends beyond the front wall 14 of housing 10 to provide easy access thereto. Preferably, a control knob 16 is provided at the forward end of shaft B for easy manipulation thereof. Shaft B comprises two coaxial shafts, an inner shaft 15 and an outer shaft 19. Shaft 15 is mounted to rear wall 12 of housing 10, and shaft 19 is mounted thereon to be rotatably and axially movable relative thereto as well as with respect to housing 10. In the normal axial position of knob 16, the rotation of knob 16 will rotate shaft 19 and turret C which is releasably mounted to shaft 16. This rotation will serve to select the desired channel, as described in detail below. When knob 16 is axially moved to its inner position (towards the left in the drawings), shaft 19 moves axially relative to shaft 15 and the rotation thereof will serve only to condition means G to perform fine tuning. In the inner position, shaft 19 is declutched from turret C by a standard clutching mechanism comprising two sets of gear teeth 18, 20 on shaft 19 and corresponding teeth (not shown) on the inner surface of turret C. When shaft 19 is in the normal position the teeth on shaft 19 mesh with the teeth on turret C causing engagement therebetween. Shaft 19 is retained in its normal outer position by means of a spring 68 described in detail below. However, then shaft 19 is axially moved, teeth 18, 20 relocate in grooves 21, 23 in turret C respectively, thus disengaging turret C from shaft 19. Therefore, in the depressed position the rotation of shaft 19 will not rotate turret C.

Turret C is shown as having eight position adjustable members D thereon. However, it should be noted that as many position adjustable members D may be provided on turret C as desired but that as the number of position adjustable members D increases so does the size of turret C. Therefore, it is normally desirable to keep the number of position adjustable members D to approximately the number of UHF channels available in a given area. Since there are usually no more than a few UHF channels operating in any one particular area, the configuration depicted should be adequate to tune all of the operating UHF stations in the area in which the receiver is utilized.

Turret C comprises a disc-shaped front end section 24 and a disc-shaped rear end section 26 connected together by a hollow cylindrical body section 36. Between end section 24, 26 a plurality of screw elements 28 are rotatably mounted parallel to the axis of section 36 and spaced therefrom. One screw element is provided for each position adjustable member D. Each screw element is provided with a threaded portion 30 which is normally engaged by a position adjustable member D which is internally threaded. Each of the position adjustable members D is provided with an outwardly radially extending cam member 32 and on the opposite side thereof an inwardly radially extending rod member 34. The body of the turret 36 is provided with a plurality of axially extending linear peripheral grooves 38. Each of the rod members 34 extends into a different one of the grooves 38. Thus, as element 28 is rotated, the position adjustable member D mounted thereon will axially move relative to element 28 because of the engagement of threaded portion 30 with the internal threads of member D. As member D is axially moved, rod member 34 will remain within the groove 38 associated therewith but will travel along the length of body portion 36. The rod and groove combination prevents the rotation of position adjustable member D with respect to body portion 36 but permits axial movement relative thereto. In this way, cam 32 is always retained in an outwardly radially extending position relative to the axis of turret C.

Figure 1:
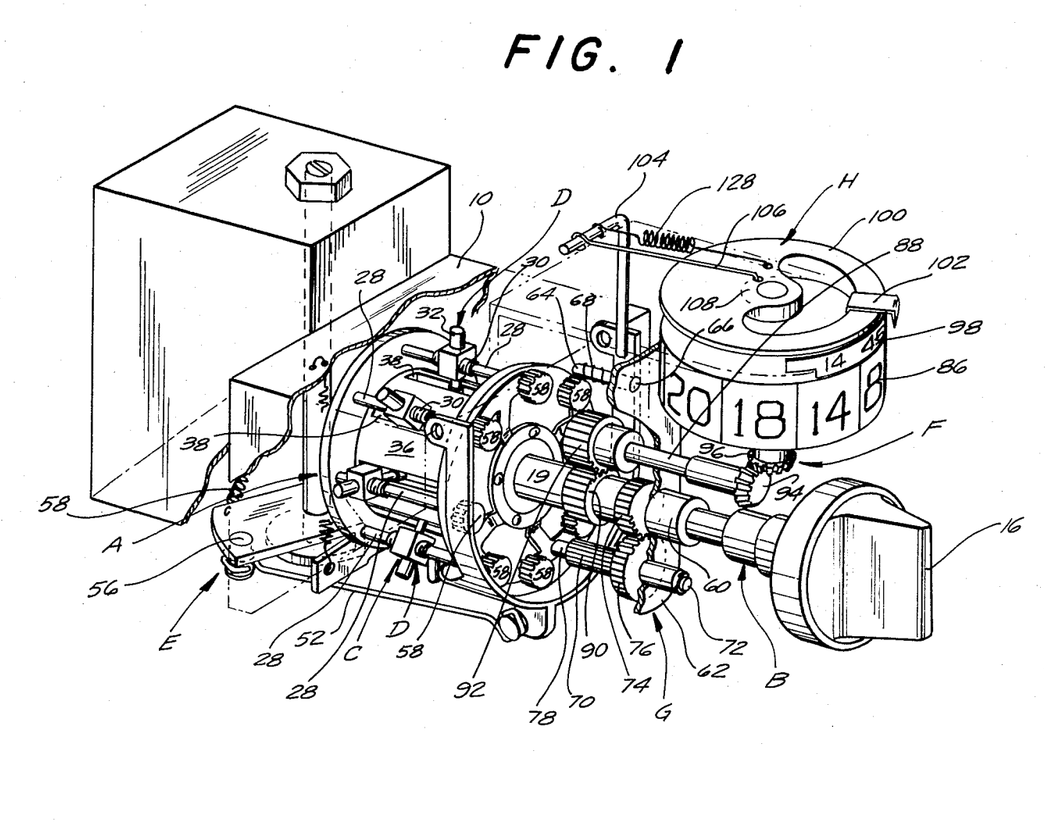
FIG. 1 is an isometric view of the tuner drive assembly of the present invention.
Figure 2:
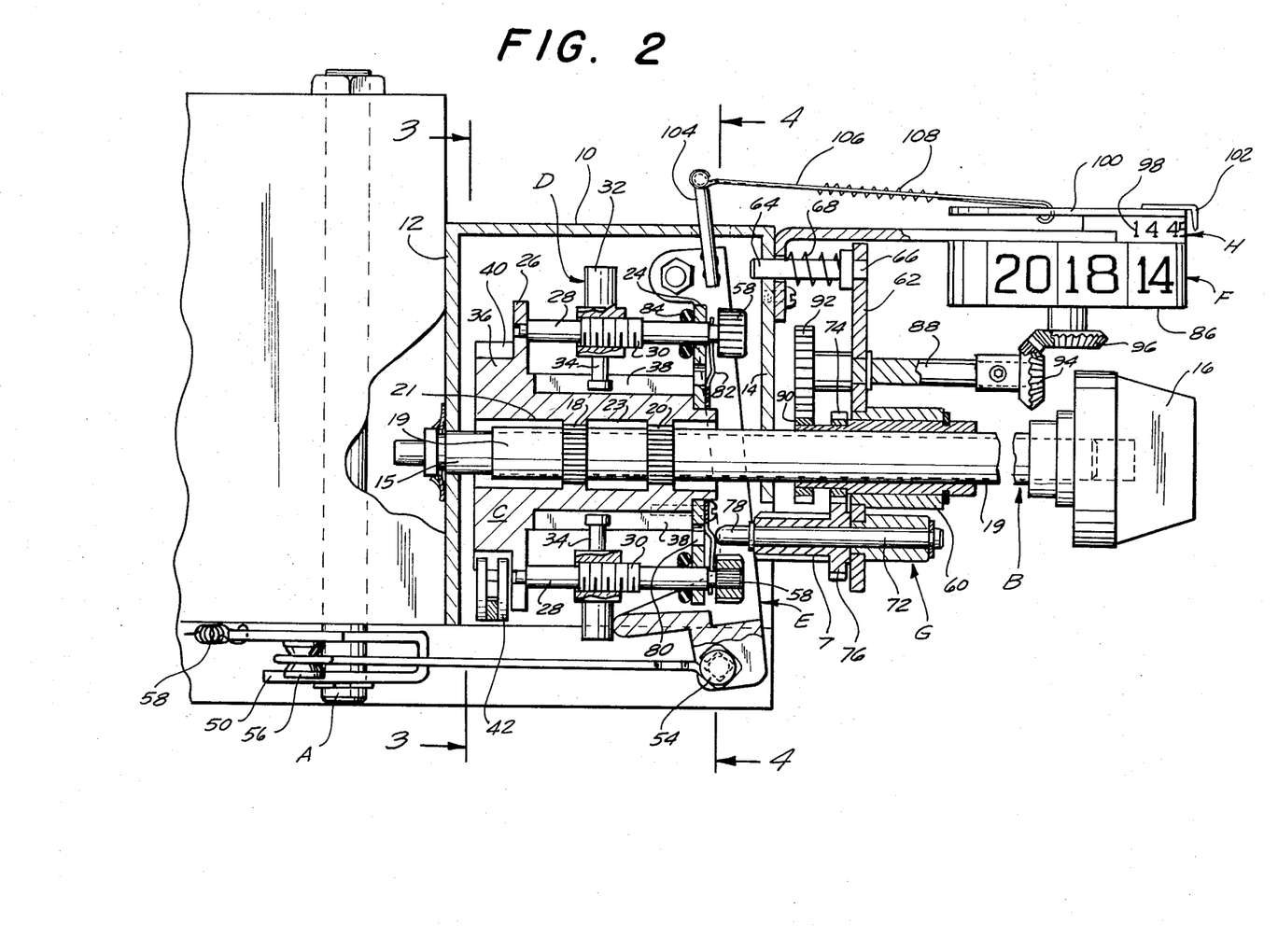
FIG. 2 is a side elevational view of the tuner drive assembly of the present invention.
Figure 3:
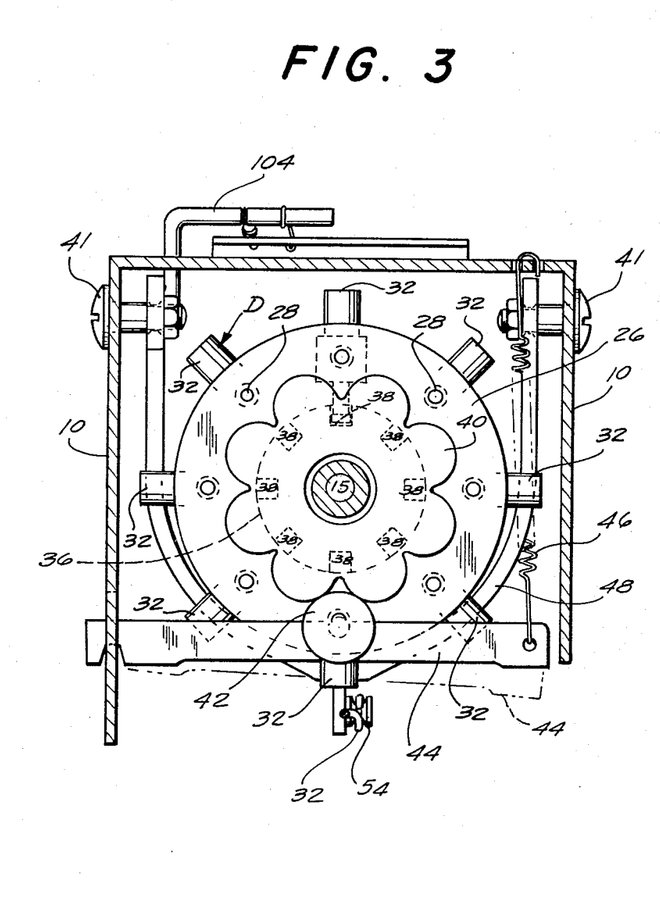
FIG. 3 is an elevational view taken along line 3—3 of FIG. 2.
Figure 4:
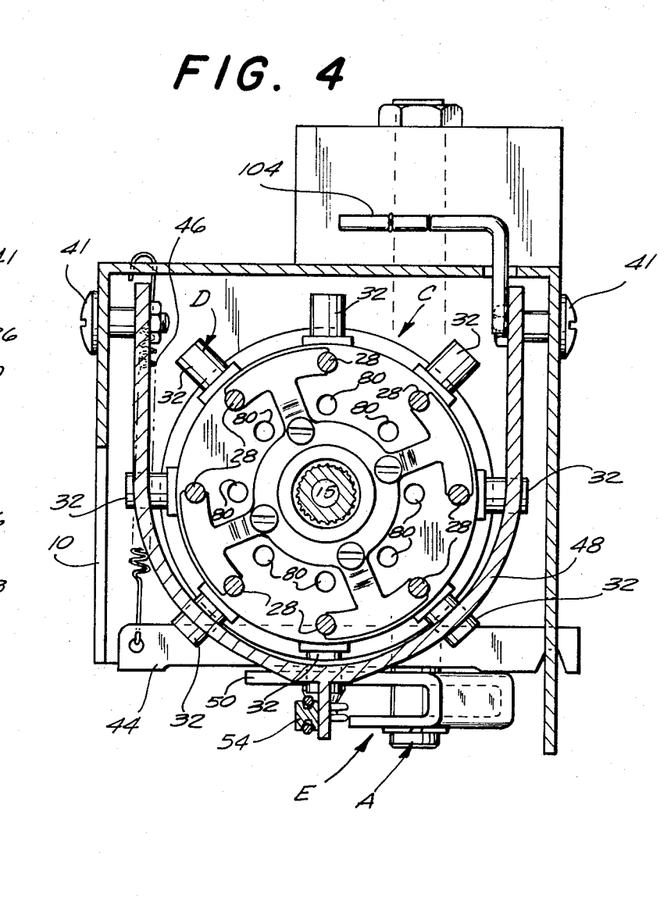
FIG. 4 is an elevational view taken along line 4—4 of FIG. 2.

As best seen in FIG. 3, the rear end section 26 of turret C is provided with a detented wheel 40 which is fixedly mounted to turret C for rotation therewith. A spring loaded detent member 42 is provided to cooperate with detent wheel 40 in the well-known detent fashion. Detent member 42 is mounted on bar 44 one end of which is pivotally mounted on housing 10. The other end of bar 44 is connected to the top of housing 10 by means of spring 46. Spring 46 provides a bias force on bar 44 which maintains detent member 42 in contact with detent wheel 40.

Figure 5:
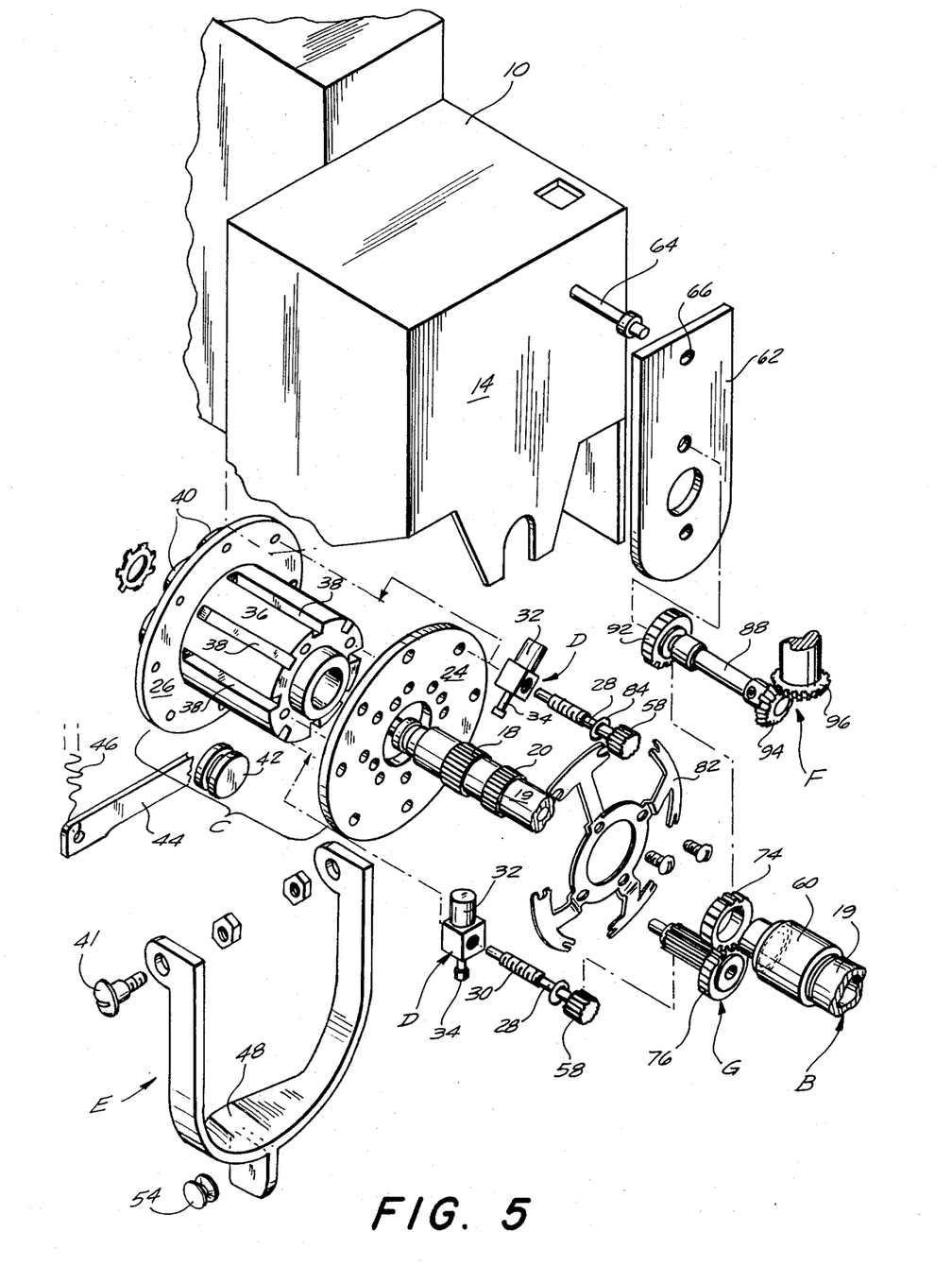
FIG. 5 is an isometric exploded view of the tuner drive assembly of the present invention.

Yoke-shaped cam follower member E (FIG. 5) is pivotally mounted to housing 10 by means of screws 41 such that the cam follower portion 48 thereof contacts the cam 32 on the position adjustable member D corresponding to the channel to which the receiver is tuned. As shown in the drawings, the position adjustable member D which contacts cam follower E is the one which is in the extreme bottom position on turret C. The pivotal position of cam follower E is determined by the axial position of the cam 32 which is in contact therewith. Cam follower portion 48 of member E is preferably flat and square with the plane of pivotal motion of member E and thus parallel with the locus of points determined by the cams 32 when turret C is rotated. This prevents errors due to inaccuracy of turret detenting, side motion of member E itself, and small variations of the position of the cam due to clearance between rod members 34 and grooves 38.

Member E is connected to a pivot arm 50 by means of a link 52. Preferably, the end of portions of link 52 are shaped so as to couple member E and pivot arm 50 in a way to insure constant effective length of the distance between the pivot arm 50 and member E. This is accomplished by means of V-shaped interface surfaces so as to achieve consistent feeding of link 52 connected to a bushing 54 mounted on member E and a pivot arm stud 56 situated on pivot arm 50. This configuration substantially reduces random errors due to link position variables. Pivot arm 50 is fixedly mounted on tuner input shaft A such that shaft A is rotated to a position in accordance with the pivotal position of member E. Pivot arm 50 is provided with a spring 58 to maintain the appropriate bias thereon. In this way, the axial position of cam 32 on the position adjustable member D in contact with member E determines the rotational position of input shaft A thus corporeally conditioning the tuner mechanism to select the desired channel.

Since it is the axial position of position adjustable members D which determines the frequencies to which the tuner mechanism will be set by the tuner drive assembly, it is necessary to provide some means for selecting the desired axial position of each of the position adjustable members D with respect to its corresponding screw element 28. This is accomplished through the use of means G which will permit the original positioning of each of the position adjustable members D (preferably during installation of the receiver) as well as fine tuning during operation of the receiver. Each of the screw elements 28 is provided with a pinion gear 58 on the front end (right as seen in the drawings) thereof. Gears 58 are situated adjacent the exterior surface of front section 24 thus permitting access thereto from the front of turret C. When knob 16 is axially moved towards turret C, collar 60, fixedly mounted on shaft 19, is axially moved therewith. The movement of collar 60 moves a plate 62 which is mounted on housing 10 by means of pin 64. Pin 64 is provided with a spring 68 situated around the pin. An aperture 66 is provided on plate 62 in alignment with pin 64 such that the movement of plate 62 causes pin 64 to pass through aperture 66 thus compressing spring 68 which serves to bias plate 62 towards its normal position (towards the right in the drawings) and, in turn, moves shaft 19 towards its normal position. A gear 70 is mounted on a shaft 72 which in turn is rotatably mounted on plate 62. Gear 70 is positioned to mesh with the gear 58 adjacent thereto. The rotation of shaft 19, when knob 16 is depressed, is transferred to gear 70 by means of gear 74, which is fast on shaft 19 and which meshes with a gear 76 which is fast on shaft 72. When plate 62 is moved such that gear 70 meshes with gear 58, the nose 78 of shaft 72 protrudes into an aperture 80 provided on front section 24 for this purpose. One aperture 80 is provided for each screw element 24. Thus, when knob 16 is depressed, the rotation thereof is transferred to the gear 58 aligned with gear 70 to rotate the element 28 associated with that gear 58 thus axially moving the position adjustable element D mounted to that element 28.

When the receiver is installed, this mechanism will be utilized to locate each of the position adjustable elements D to corporeally condition the tuner mechanism to select one of the available UHF channels in that area. As turret C is rotated each position adjustable element D in turn, as it contacts member E, will cause the tuner mechanism to select the frequency determined by the axial position thereof. After setting of the position of each member D during installation, these positions normally need only be varied slightly to achieve optimum reception. This slight variation will accomplish fine tuning if necessary and is performed by means G in the manner described above. Therefore, means G has a dual purpose in that it is used to preset the axial position of each of the position adjustable members D such that the tuner mechanism is conditioned to select the desired channel as well as permitting fine tuning of each channel during operation of the receiver.

The threaded portion 30 of each element 24 is spaced from each of the end sections 24 and 26 of turret C respectively. This spacing permits position adjustable element D to run off either side of threaded portion 30 when it approaches either one of the end sections 24 or 26. Such a configuration is necessary to prevent jamming and breakage of the assembly which would normally occur if gear 58 was rotated causing the position adjustable member D to lodge up against one of the end sections. Further rotation of gear 58 in this direction would cause breakage of the mechanism because of the limitations placed on the axial movement of member D by the end section adjacent thereto. In order to prevent this, threaded portion 30 is spaced from either of the end sections 24 or 26 by a distance slightly less than the distance between the last thread on the position adjustable member to remain in engagement with the threaded portion and the opposite end of the position adjustable member therefrom. Means are provided to permit position adjustable member D to run off the threads of threaded portion 30 at each end of travel and also to cause position adjustable member D to re-engage threaded portion 30 when gear 58 is rotated in the opposite direction. Thus, if gear 58 is rotated causing a position adjustable member D to move to the end of travel in one direction, the mechanism will not jam or break because the threaded portion 30 will be disengaged from position adjustable member D. However, when gear 58 is rotated in the opposite direction, position adjustable member D will be caused to re-engage the threads of threaded portion 30 thus permitting the mechanism to continue its normal mode of operation.

In order to accomplish this function, when position adjustable member D reaches the end of travel and is adjacent to rear end section 26 of turret C (see FIG. 7), each of the elements 28 is made axially movable with respect to end sections 24 and 26. Elements 28 are therefore axially movable between a normal position (as shown by the lower element 26 in each of FIGS. 6 and 7) to an offset position (as shown by the upper element 28 in FIG. 7). Thus, when gear 58 is rotated in a direction to cause position adjustable member D to move to a position wherein it is adjacent rear section 26, further rotation in this direction of gear 58 will cause position member D to run off the threads of threaded portion 30 by axially moving element 28 from the normal position to the offset position. Therefore, further rotation of gear 58 in this direction will not cause jamming or breakage of the mechanism. A resilient member in the form of spider 82 is positioned on the face of end section 24 to provide a biasing force on each of the elements 28 tending to move that element towards its normal position when the element 28 is in its offset position. The force on element 28 caused by member 82 will cause position adjustable member D to re-engage the threads of threaded portion 30 when gear 58 reverses direction.

Spider 82 also performs the additional function of biasing the screw elements 28 against rear section 26. Thus no axial movement of elements 28 is permitted during normal operation of the assembly (i.e. when members D are not adjacent rear section 26). This is important because the axial position of member D determines the frequency to which the receiver is tuned. Thus the accuracy of the assembly is enhanced by stabilizing the axial position of the screw elements 28 by spider 82.

Figure 6:
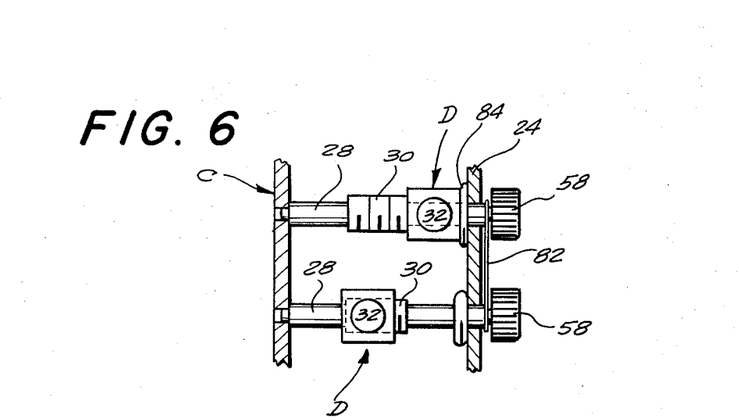
FIG. 6 is a fragmentary plan view of two of the screw elements of the present invention showing the internally threaded member running off the threaded portion in one direction.
Figure 7:
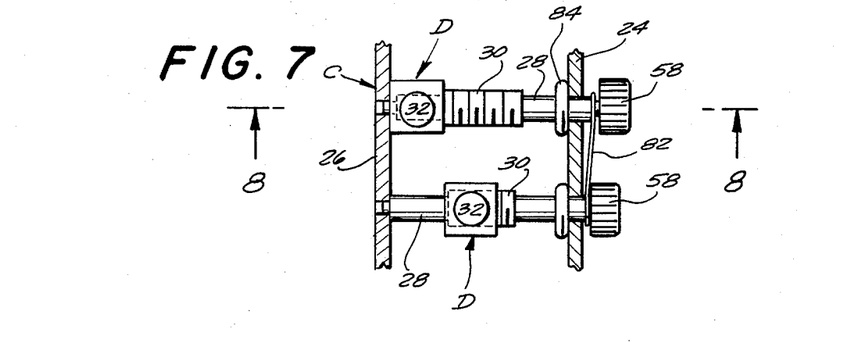
FIG. 7 is a view similar to FIG. 6 but showing the internally threaded member running off the threaded portion of the screw element in the other direction.
Figure 8:
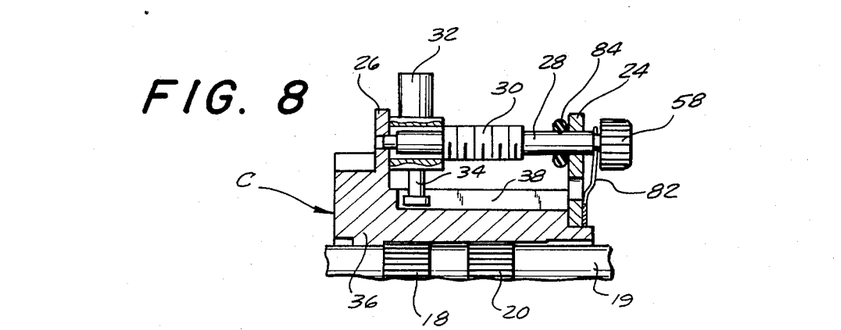
FIG. 8 is an elevational view taken along line 8—8 of FIG. 7.

A different mechanism is provided to accomplish the same function when position adjustable member D reaches the other end of its travel. In this case an O-ring 84, preferably made of neoprene or other low durometer rubber compound, permits the necessary thread run-off. O-ring 84 may form a part of end section 24 itself or may be a separate body, as desired. As can be seen in FIG. 6, as gear 58 is rotated to cause position adjustable member D to move adjacent to end section 24, O-ring 84 will be compressed permitting position adjustable member D to disengage threaded portion 30. Position adjustable member D will remain disengaged as long as gear 58 is rotated in the same direction. However, when gear 58 is rotated in the opposite direction, O-ring 84 will tend to return to its original configuration thus forcing position adjustable element D to re-engage threaded portion 30.

In this way, jamming and breakage of the mechanism is prevented at either end of travel along element 28. Further, no complicated stop mechanisms are necessary to prevent rotation of gear 58 beyond its permissible limits. The foregoing is a simple and inexpensive method of permitting continuous rotation of elements 28 without jamming or breakage of the mechanism.

Channel indicia means F is provided to display a numeral corresponding to the rotational position of turret C and thus the channel selected. This is accomplished by a rotatable drum 86 which is provided with a plurality of windows into which a numeral representing the channel selected at that position of the drum may be inserted. A shaft 88 is rotatably mounted on plate 62 for movement therewith. When knob 16 is in the normal position, a gear 90, located on shaft 19, meshes with a gear 92 situated on shaft 88 thus transferring the rotation of shaft 19 to shaft 88. A pair of bevel gears 94 and 96 serve to transfer the rotation of shaft 88 to drum 86. When knob 16 is depressed, bevel gear 94 is moved relative to bevel gear 96 to cause disengagement thereof such that the rotation of shaft 19 is not transferred to drum 86. In this way, during channel selection, drum 86 is rotated simultaneously with turret C, but during fine tuning neither turret C nor drum 86 are rotated, thus preventing the rotation of shaft 19 during fine tuning from effecting either the channel to which the tuner is tuned or the indication thereof.

In order to assist the installer in presetting the axial position of each of the position adjustable members D such that the tuner will select the desired UHF channels, a second indicia means H is provided. Second indicia means H comprises a scale 98 calibrated to indicate each of the possible UHF channels. A rotatable disc 100 is provided adjacent the scale with a scale pointer 102 aligned with scale 98. The rotational position of disc 100 will reflect the axial position of the position adjustable member D which is located in the operable position on turret C. This is accomplished by a linkage between member E and the disc 100. This linkage consists of an L-shaped bar 104 which is mounted at one end to cam follower member E such that it moves as member E is pivoted. A connecting rod 106 is connected at one end to bar 104 and at the other to an aperture 108 which is located on disc 100 at a position offset from the rotational axis thereof. To eliminate play between the disc 100 and bar 104, a spring 108 is provided connected therebetween. The installer, when adjusting a position adjustable member D to tune one of the desired UHF channels, will look at scale 98 while manipulating means G to assist in axially setting the position of member D. After the positions of each of the position adjustable members D has been set, the second indicia means H will normally be covered by the housing of the receiver as it is not necessary that it be exposed to view under normal circumstances. However, if desired, scale 102 may remain visible. After presetting each of the position adjustable members D to provide the desired channel, the installer will select the appropriate numerals corresponding to the channel selected from a collection of such numerals provided with the tuner and place the appropriate numeral in the corresponding window on drum 86. In this way, the indicia means will reflect the numeral corresponding to the channel selected at any given time.

A single preferred embodiment of the present invention has been disclosed herein for purposes of illustra-

I claim:

1. A tuner drive assembly for use with a tuning mechanism having a rotary control shaft comprising a housing, a rotatable input shaft mounted on said housing, a rotatable turret situated in said housing and operably connected to said input shaft to be driven thereby, said turret comprising first and second spaced end sections with a screw element rotatably mounted therebetween, said element having a threaded portion, means for rotating said element, an internally threaded member normally engaging said portion and axially movable by rotation of said element, said portion being spaced from said end sections respectively by a distance slightly less than the distance between the last thread on said member to engage said portion and the opposite end of said member therefrom, means for permitting said member too disengage from said portion when said element is rotated in a direction to move said member adjacent one of said end sections and effective when disengagement occurs to urge said member and said portion together to cause re-engagement thereof when said element is rotated in the opposite direction and sensing means for sensing the axial position of said member, said sensing means being operably connected to said control shaft to rotate same in accordance with the position of said member.

2. The assembly of claim 1 wherein said disengagement permitting means comprises means for permitting axial movement of said element relative to said end sections between a normal position and an offset position, said element being moved from said normal position to said offset position by the rotation of said element in said direction after said member is adjacent said first end section.

3. The assembly of claim 2 wherein said disengagement permitting means further comprises resilient means operably connected to said element to exert a force on said element to tend to axially move said element from said offset position to said normal position.

4. The assembly of claim 1 wherein said disengagement permitting means comprises compressible means situated between said member and said second section.

5. The assembly of claim 3 wherein said disengagement permitting means further comprises compressible means situated between said member and said second section.

6. A tuner assembly for use with a tuning mechanism having a rotary control shaft comprising a housing, a rotatable input shaft mounted on said housing, a movable turret situated on said housing and operably connected to said input shaft to be driven thereby, said turret having a position adjustable element thereon, means for adjusting the position of said element relative to said turret, means effective when said turret is moved to bring said element into alignment therewith to drive said control shaft in accordance with the position of said element, said control shaft drive means comprising a horseshoe shaped element pivotably mounted to said housing, adapted to contact said element and to pivot to a position determined by the position of the element relative to said turret, linking means for driving said control shaft in accordance with the pivotable position of said horseshoe shaped element, first indicating means operably connected to said turret to indicate the rotational position thereof and second indicating means operably connected to said control shaft drive means to indicate the position of said element.

7. The assembly according to claim 6 wherein said control shaft indicating means comprises a scale, a scale pointer movable with respect to said scale and means operably connecting said pointer to said horseshoe-shaped element.

8. The assembly according to claim 7 wherein said connecting means comprises a rotatable disc for carrying said pointer and a member one end of which is operably connected to said horseshoe-shaped element and the other end of which is connected to said disc at a point radially offset from the axis thereof.

9. The assembly according to claim 8 wherein said connecting means further comprises a tension spring connected between said horseshoe-shaped element and said disc.

* * * * *